(12) United States Patent
Mateer et al.

(10) Patent No.: US 11,182,767 B1
(45) Date of Patent: Nov. 23, 2021

(54) SYSTEMS AND METHODS FOR MANAGING PAYMENTS USING A COMMUNICATION DEVICE

(75) Inventors: Michael T Mateer, Omaha, NE (US); James K Boutcher, Omaha, NE (US)

(73) Assignee: WEST CORPORATION, Omaha, NE (US)

( * ) Notice: Subject to any disclaimer, the term of this patent is extended or adjusted under 35 U.S.C. 154(b) by 971 days.

(21) Appl. No.: 12/780,069

(22) Filed: Jun. 23, 2010

Related U.S. Application Data (63) Continuation-in-part of application No. 12/546,119, filed on Aug. 24, 2009, now abandoned.

(51) Int. Cl.
  *G06Q 20/32* (2012.01)
  *G06Q 20/10* (2012.01)
  *H04W 4/14* (2009.01)

(52) U.S. Cl.
  CPC ....... *G06Q 20/3255* (2013.01); *G06Q 20/102* (2013.01); *H04W 4/14* (2013.01)

(58) Field of Classification Search
  USPC ......................................................... 705/40
  See application file for complete search history.

(56) References Cited

U.S. PATENT DOCUMENTS

| | | | | |
|---|---|---|---|---|
| 7,542,943 B2 * | 6/2009 | Caplan | ................ | G07F 17/0014 705/35 |
| 8,116,439 B1 * | 2/2012 | Runcie | ................... | H04M 3/20 379/88.12 |
| 8,239,326 B1 * | 8/2012 | Yuen | .................... | G06Q 20/425 705/44 |
| 8,255,323 B1 * | 8/2012 | Casey | ................... | G06Q 20/42 705/39 |
| 8,401,964 B2 * | 3/2013 | Radu | ...................... | G06Q 20/10 705/39 |
| 8,554,671 B2 * | 10/2013 | Bailout | .................. | G06Q 30/02 705/39 |
| 8,688,570 B2 * | 4/2014 | Jones | ..................... | G06Q 20/10 705/39 |
| 2005/0223062 A1 * | 10/2005 | Doan | .................... | H04L 51/14 709/206 |
| 2007/0206612 A1 * | 9/2007 | Yang | ...................... | H04M 3/54 370/401 |
| 2007/0300183 A1 * | 12/2007 | Anttila | .................... | H04L 51/24 715/808 |
| 2008/0010191 A1 * | 1/2008 | Rackley, III | ........... | G06Q 20/10 705/39 |
| 2008/0034040 A1 * | 2/2008 | Wherry | ................ | G06Q 10/107 709/204 |
| 2008/0057910 A1 * | 3/2008 | Thoresson | ............ | H04M 1/724 455/412.1 |
| 2008/0108327 A1 * | 5/2008 | Hsu | ........................ | H04L 51/24 455/412.1 |

(Continued)

*Primary Examiner* — Alexander G Kalinowski
*Assistant Examiner* — Paul R Kloberg (57) ABSTRACT

The illustrative embodiments described herein provide systems and methods for managing payments to a payee using a communication device associated with a payor. In one embodiment, the method includes accessing billing data associated with a payor, and determining whether to send a payment notification to the communication device based on the billing data. The method also includes sending the payment notification to the communication device. The payment notification initiates a prompt on the communication device.

14 Claims, 10 Drawing Sheets

(56) References Cited

U.S. PATENT DOCUMENTS

| | | | | |
|---|---|---|---|---|
| 2008/0126484 A1* | 5/2008 | Wherry | H04L 63/10 | 709/204 |
| 2008/0133407 A1* | 6/2008 | Guillory | G06Q 30/04 | 705/40 |
| 2009/0138808 A1* | 5/2009 | Moromisato | G06Q 10/10 | 715/758 |
| 2009/0143057 A1* | 6/2009 | Arun | H04M 3/42 | 455/418 |
| 2009/0192970 A1* | 7/2009 | O'Sullivan | H04L 51/04 | 706/48 |
| 2009/0327422 A1* | 12/2009 | Katis | H04L 12/1827 | 709/204 |
| 2014/0129432 A1* | 5/2014 | Hanson | G06Q 30/04 | 705/40 |
| 2014/0310174 A1* | 10/2014 | Heeter | G06Q 20/3276 | 705/44 |
| 2016/0171577 A1* | 6/2016 | Robinson, Jr. | G06Q 30/0613 | 705/7.13 |

* cited by examiner

SYSTEMS AND METHODS FOR MANAGING PAYMENTS USING A COMMUNICATION DEVICE

CROSS-REFERENCE TO RELATED APPLICATIONS

The present patent application is a continuation-in-part of patent application Ser. No. 12/546,119, filed on Aug. 24, 2009, and entitled SYSTEMS AND METHODS FOR MANAGING PAYMENTS USING A COMMUNICATION DEVICE, the entire contents of which are incorporated by reference herein.

BACKGROUND

1. Field of the Invention

The present invention relates generally to systems and methods for managing payments in a network data processing system. More particularly, the present invention relates to systems and methods for managing payments using a communication device.

2. Description of the Related Art

Bill payment can sometimes be an arduous task that requires a payor to take inconvenient measures. A payor is any person or entity that pays, or is under an obligation to pay, another person or entity. In some cases, paying a bill requires a payor to manually write a check, and either mail or deliver the check to a physical location. Other types of bills require payment using immobile, or hard-to-carry, devices that cannot be conveniently carried by a payor. A payor's inconvenience is further aggravated by the potentially large number of different bills, and other payments, that a payor must manage. In view of the other life responsibilities that must often be managed, one can easily lose track of when bills are due, and how much must be paid.

SUMMARY

The illustrative embodiments described herein are directed to a data processing system and, in particular, to systems and methods for managing payments to a payee using a communication device associated with a payor. In one embodiment, the method includes accessing billing data associated with a payor, and determining whether to send a payment notification to the communication device based on the billing data. The method also includes sending the payment notification to the communication device. The payment notification initiates a prompt on the communication device.

In another embodiment, a data processing system includes a bus system and a memory connected to the bus system. The memory includes a set of instructions. The data processing system also includes a processing unit connected to the bus system. The processing unit executes the set of instructions to access a payment transaction database to identify billing data associated with a payor, determine whether to send a payment notification to a communication device associated with the payor based on the billing data, identify the communication device associated with the payor, determine whether the communication device has a payment notification application by accessing an application distribution database, and wake the payment notification application to initiate a payment reminder prompt on the communication device.

In another embodiment, a computer-implemented method for deploying computer readable code for managing payments to payees using a communication device associated with a payor includes receiving a set of parameters about a payor and identifying a payment notification application for use in response to receiving the set of parameters. The payment notification application includes computer usable program code capable of receiving a payment notification, displaying a payment reminder prompt on a graphical user interface of the communication device, receiving payment input from the payor to form payment data, and sending the payment data when the computer usable program code is deployed in the communication device. The method also includes deploying the payment notification application to the communication device.

DETAILED DESCRIPTION

Figure 1:
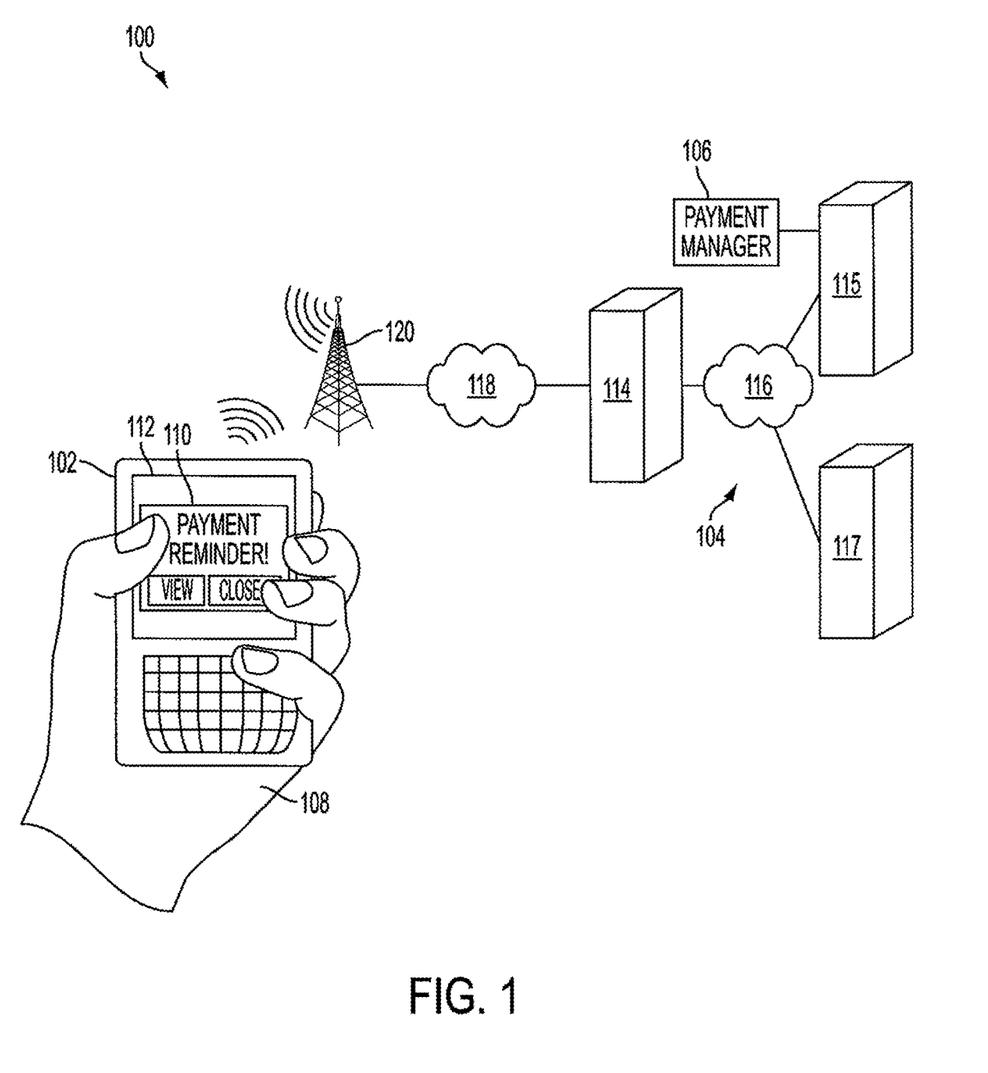
FIG. 1 is a schematic, pictorial representation of a network data processing system for managing payments to a payee using a communication device associated with a payor according to an illustrative embodiment.

Referring to FIG. 1, an illustrative embodiment of a network data processing system 100 in which a payment management system may be implemented includes a communication device 102 that wirelessly communicates with a remote network of computers 104. The communication device 102 is any device capable of communicating with a user or another device. Non-limiting examples of the communication device 102 include cellular phones, walkie talkies, laptop or netbook computers, personal digital assistants, digital music players, etc. The network of computers 104 may include servers, clients, or back-end computers capable of executing a payment manager 106 that manages payments for a payor 108. Unless otherwise indicated, as used herein, "or" does not require mutual exclusivity.

Using the network data processing system 100, the payor 108 may download a payment notification application (not shown) onto his or her communication device 102, and use the payment notification application to manage payments to payees. A payee includes any person or entity to which a payment, in any form, has become, is currently, or will become due. Non-limiting examples of payees include banks, car companies, credit card companies, vendors, or other persons or entities that accept payment.

In one embodiment, the payment manager 106 receives billing data from the payor 108, one or more payees associated with the payor 108, or another source. When a payment from the payor 108 has become due, or will become due in a predetermined time period, the payment manager 106 sends a payment notification over the network data processing system 102, and to the communication device 102. The receipt of the payment notification at the communication device 102 can cause the payment notification application contained thereon to "wake up", and display a payment notification prompt 110 on a graphical user interface 112 of the communication device 102. The payment notification application on the communication device 102 may then work in conjunction with the payment manager 106 to initiate a payment prompt sequence on the graphical user interface 112 that allows the payor 108 to pay bills or make payments, thereby allowing the payor 108 to pay his or her bills using the communication device 102.

The network of computers 104, which may serve as the back-end to a payment management system, can include any number of computers 114, 115, 117 that are interconnected using any data communication medium 116. The data communication medium 116 can utilize a virtual private network (VPN), multiprotocol label switching (MPLS), the Internet, or any other data communication medium. These non-limiting examples may also be used by a data communication medium 118 between the network of computers 104 and a cell site tower 120. Wireless communication between the communication device 102 and the cell site tower 120 may utilize any wireless standard for communicating data, such as CDMA, including cdmaOne or CDMA2000, GSM, 3G, Edge, an Over-the-air network, Bluetooth, etc.

In one example, the network data processing system 100 or the network of computers 104 may be the Internet with the data communication media 116, 118 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Referring to FIGS. 2-9, a payment management system 222, along with associated examples of prompts on a graphical user interface 212, is shown according to an illustrative embodiment. Components of FIG. 2 that are analogous to components in FIG. 1 have been shown by indexing the reference numerals by 100. The payment management system 222 includes a payment manager 224 that can be implemented on the network of computers 104 shown in FIG. 1. For example, the components of the payment manager 224 may be implemented on a single computer, such as the computer 115, in FIG. 1, any combination of the computers 114, 115, 117 in the network of computers 104, or even the communication device 102. The payment manager 224 facilitates payment from the payor 208 to a payee 226 by allowing the payor 108 to use the communication device 202 to make a payment to the payee 226.

Figure 2:
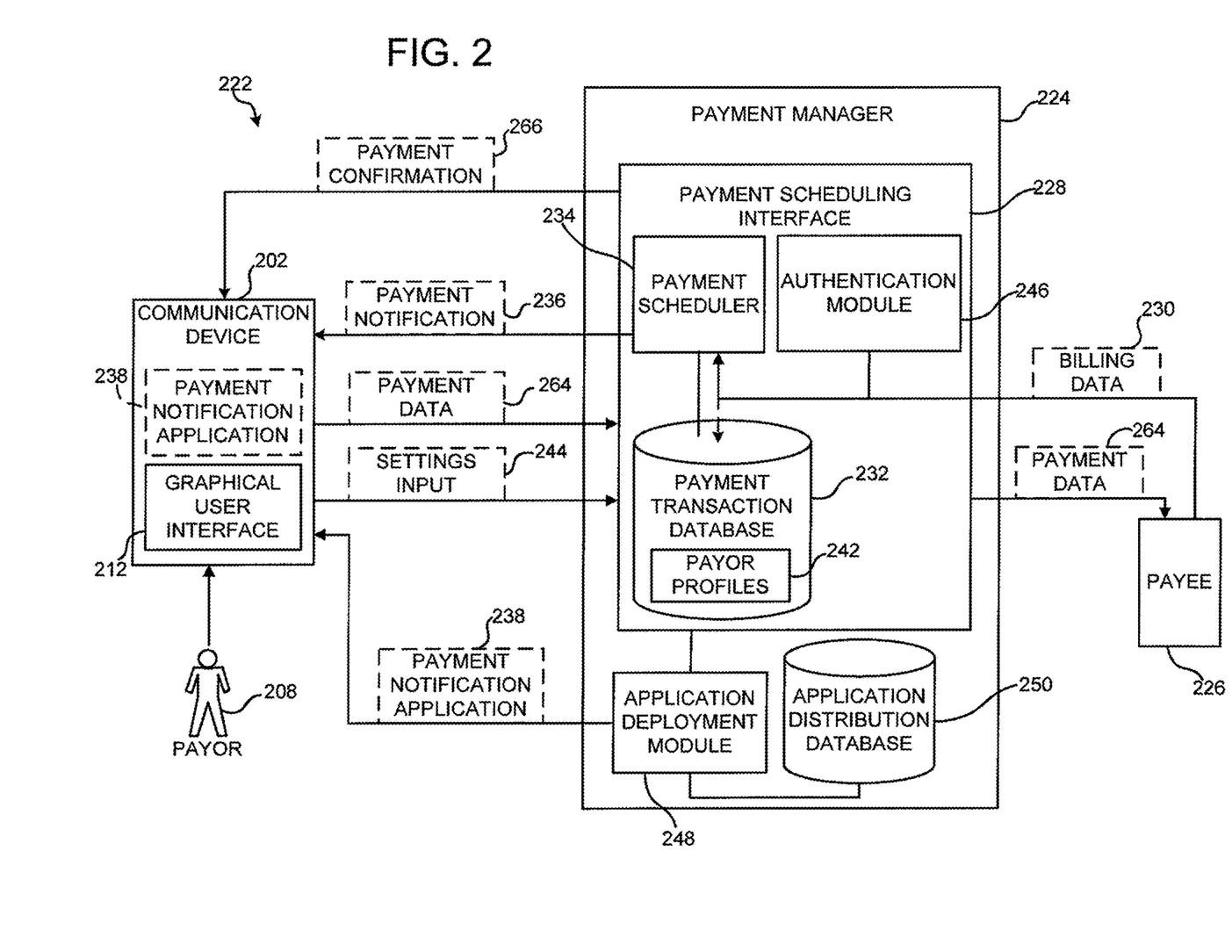
FIG. 2 is a schematic, block diagram of a payment management system in accordance with an illustrative embodiment.

In one embodiment, a payment scheduling interface 228, which acts as an interface between the communication device 202 and the payee 226, collects billing data 230 associated with the payor 208 from the payee 226. In another embodiment, the billing data 230 may be collected from the payor 208 through the communication device 202, or from a third-party source. The billing data may also be collected by an administrator of the payment manager 224 from a client of the administrator, such as the payee 226. In another embodiment, the billing data 230 may be accessed using real-time interfaces, including, for example, Simple Object Access Protocol (SOAP) web services. The billing data 230 includes information related to payments that are owed from the payor 208, such as the identity of the payee 226, the payment due date, late fees owed, when late fees are incurred, a payment due amount, a previous payment amount, previously-used payment methods, account numbers, principal and interest amounts, and other such billing information.

The billing data 230 is stored in a payment transaction database 232, where the billing data 230 can be accessed by a payment scheduler 234. Using the billing data 230, the payment scheduler 234 is able to determine whether to send a payment notification 236 to the communication device 202. The billing data 230 may be utilized by the payment scheduler 234 in a variety of ways to make the determination as to whether to send the payment notification 236. For example, the payment scheduler 234 may send the payment notification 236 when a payment becomes due to the payee 226. In another non-limiting example, the payment scheduler 234 may send the payment notification 236 when the balance owed to the payee 226 exceeds a predetermined threshold. In another non-limiting example, the payment scheduler 234 may send the payment notification 236 in advance of payment being due, such as three (3) days before payment is due, seven (7) days before payment is due, etc.

The payment scheduler 234 may also access payor profiles 242 when determining whether to send the payment notification 236. The payor profiles 242 may be stored in the payment transaction database 232, or a separate database (not shown). The payor profiles 242 contain data related to the payor 208. For example, the payor profiles 242 may contain personal information about the payor 208, such as the name of the payor 208, the payor's contact information, payment methods used by the payor 208, including information about those payment methods, etc.

The payor profiles 242 may also contain a payor's payment preferences regarding when and how the payor 208 is notified of a payment on his or her communication device 202. For example, the payor 208 can choose to be notified at a desired period of time before a payment due date. By way of illustration, the payor 208 may prefer to be notified one week before a payment is due to the payee 226, and define such a setting in his or her payor profile 242. When payments to multiple payees 226 are managed by the payment manager 224, the payor 108 may define particular settings for each respective payee 226. By way of illustration, the payor 208 may desire to be notified of his or her car payment one week in advance, but desire to be notified of his or her mortgage payment three weeks in advance. Payment methods, and information associated therewith, may also be defined by the payor 208 and stored in his or her payor profile 242. By way of illustration, the payor 208 may input details about each of his or her credit cards, debit cards, bank accounts, or other payment methods for easy access at a later time. The payor's personal information and payment preferences may be user-definable settings that are created and changed by the receipt of settings input 244 from the communication device 202.

In another embodiment, the payment notification 236 to the communication device 202 may be triggered by the receipt of data from the payee 226 indicating that a payment is, or will be, due. In this embodiment, the payee 226 may send such data to the payment manager 224, so that the payment scheduler 234 can then send the payment notification 236 to the payor 208. Notifying the payor 208 in this manner may be considered to be "on the fly". In this embodiment, sending of the payment notification 236 may also be triggered by the receipt of a batch file, or may be triggered in real-time using, for example, a SOAP web service.

To prevent fraud, the billing data 230 may be authenticated by an authentication module 246. The authentication module 246 is capable of verifying the source of the billing data 230, the identity of the payee 226, and other information pertaining to the authenticity of the payee 226. The authentication module 246 may also serve to prevent unauthorized access to sensitive information, such as credit card numbers, in the payment transaction database 232.

Prior to sending the payment notification 236, an application deployment module 248 may determine whether the payment notification application 238 has been downloaded to the communication device 202. In one embodiment, the application deployment module 248 accesses an application distribution database 250 to make the determination as to whether the communication device 202 has the payment notification application 238. The application distribution database 250 may contain the identity of communication devices 202 that have the payment notification application 238, and may also contain information identifying the communication device 202 associated with a particular payor 208. Upon determining that the communication device 202 does have the payment notification application 238, the payment scheduler 234 may send the payment notification 236 to the communication device 202. In one embodiment, the application deployment module 248 and the application distribution database 250 may be located on a different computer 114, 115, or 117 in the network of computers 104 of FIG. 1, then one or more other components of the payment manager 224. For example, the application deployment module 248 and the application distribution database 250 may be located on the computer 114, which is communicatively coupled between the communication device 202 and the computer 115, on which other components of the payment manager 106 reside.

The application deployment module 248 may also deploy the payment notification application 238 to the communication device 202. The deployment of the payment notification application 238 may be in response to an order from the payor 208 executed through his or her communication device 202. In another example, if the application deployment module 248 determines that the communication device 202 lacks the payment notification application 238, the payor 208 may be prompted, on the communication device 202 or otherwise, as to whether he or she would like to download the payment notification application 238. If, in response to such a prompt, the payor 208 inputs that he or she would like to download the payment notification application 238, the application deployment module 248 may then proceed to send the payment notification application 238 to the communication device 202.

Figure 3:
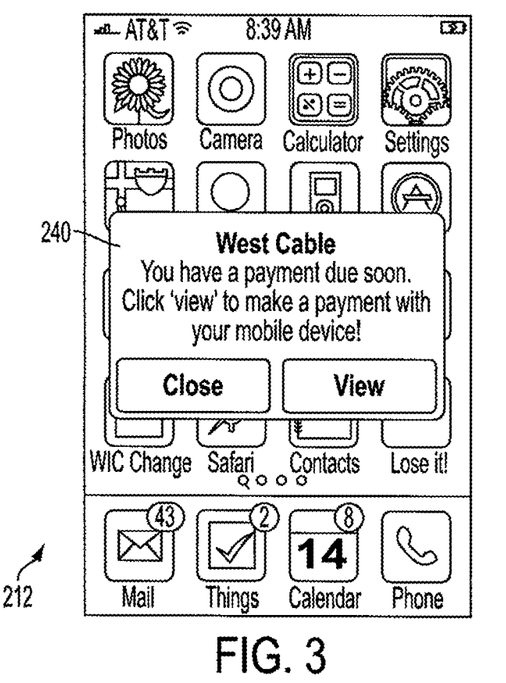
FIG. 3 is a schematic, pictorial representation of an illustrative embodiment of a payment reminder prompt displayed on a graphical user interface of a communication device.

Once received at the communication device 202, the payment notification 236 wakes up the payment notification application 238 on the communication device 202 to cause the graphical user interface 212 to display a payment notification prompt 240, as shown in FIG. 3. Such a wake up process may be implemented by sending a push notification to the communication device 202. The push notification causes the payment notification prompt 240 to be displayed on the graphical user interface 212, and the user may be able to select a "View", or other similar button, to launch the payment notification application 238. Such a push notification system may be implemented on wide variety of communication devices 202 using a wide variety of push notification type services. For example, a push notification system may be implemented on an iPhone via Apple's push notification service. The push notification system may also be implemented using, for example, port-directed SMS or Blackberry push notifications. The payment notification 236 may also initiate a payment prompt sequence in which the payment data 252 is collected from the communication device 202, and in which other steps in the payment transaction can be accomplished. Non-limiting examples of prompts in the payment prompt sequence are shown in FIGS. 3-9. The text and other graphical elements in FIGS. 3-9 are by way of example only, and any functionality associated with the payment prompt sequence can be accomplished by varying the textual and graphical details in these Figures.

Figure 4:
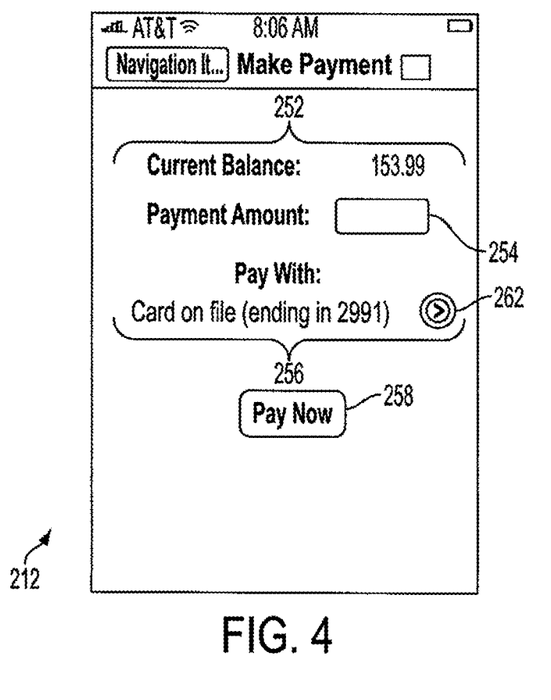
FIG. 4 is a schematic, pictorial representation of an illustrative embodiment of a prompt in which billing data is displayed.
Figure 5:
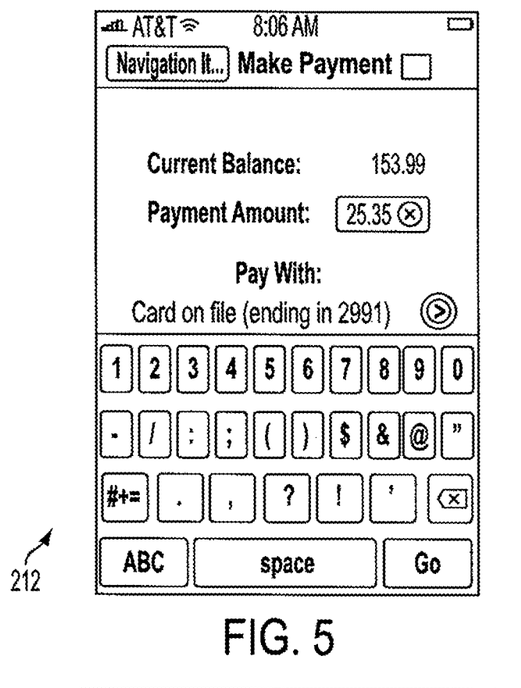
FIG. 5 is a schematic, pictorial representation of the screen in FIG. 4 in which a payment amount has been inputted in a payment amount field.

The payment reminder notification 240 shown in FIG. 3 invites the payor 208 to view payment details and make a payment using the communication device 202. If the payor 208 does not wish to view payment details or make a payment when the payment reminder prompt 240 is displayed, the payor 208 may choose to close the payment reminder prompt 240 and take no further action at that time. If the payor 208, however, decides to make a payment, a portion of the billing data 230 may be displayed on the graphical user interface 212 as shown in FIG. 4. The billing data 230 shown in FIG. 4 includes a current balance 252, a payment amount field 254, and a suggested payment method 256. Other billing data 230 may also be included in the display shown in FIG. 4, such as a payment due date, the identity of the payee 226, etc. The payor 208 may input a payment amount in the payment amount field 254 as shown in FIG. 5.

Figure 6:
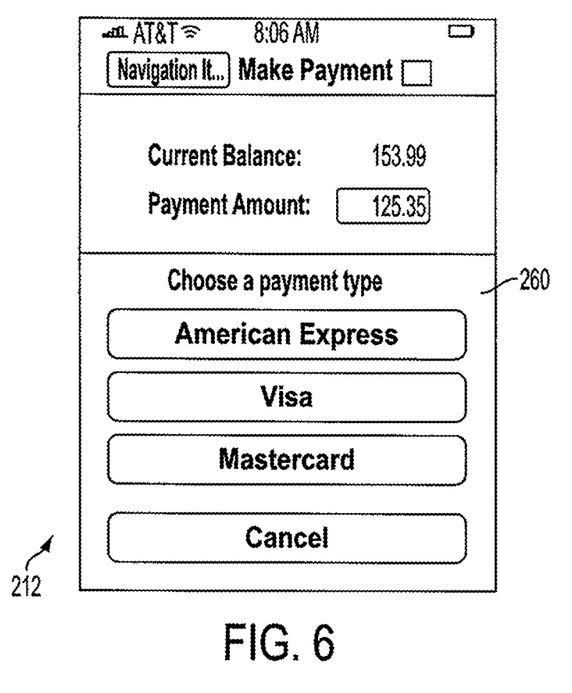
FIG. 6 is a schematic, pictorial representation of an illustrative embodiment of a payment method selection prompt.
Figure 7:
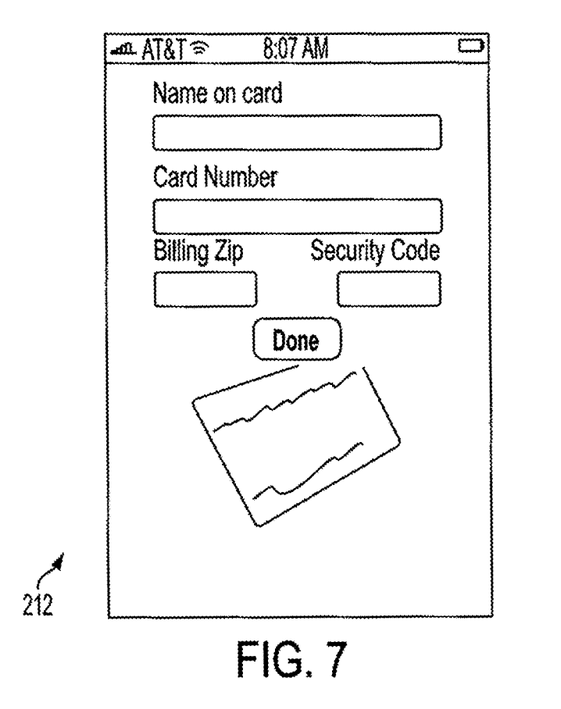
FIG. 7 is a schematic, pictorial representation of an illustrative embodiment of a prompt containing fields into which a payor can input data about a desired payment method.

Upon entering the payment amount in the payment amount field 254, the payor 208 has the option of paying the bill using the suggested payment method 256 by activating the pay button 258. In one example, the suggested payment method 256 may be determined by accessing the payor profile 242 associated with the payor 208. The payor 208 may also choose to pay using a payment method that differs from the suggested payment method 256. If so, the payor may initiate a payment method selection prompt 260, as shown in FIG. 6, by activating a button 262. The payment method selection prompt 260 displays a set of payment method options that are selectable by the payor 208. The payment method options that are selectable by the payor 208 may include a credit card, a debit card, a bank account or bank account routing number, a wire transfer, a remotely-created check on behalf of the payor 208, or any other payment method. If a credit or debit card is chosen as the payment method, a prompt such as that shown in FIG. 7 may be displayed on the graphical user interface 212. The display in FIG. 7 prompts the payor 208 to enter his or her credit or debit card information.

Figure 8:
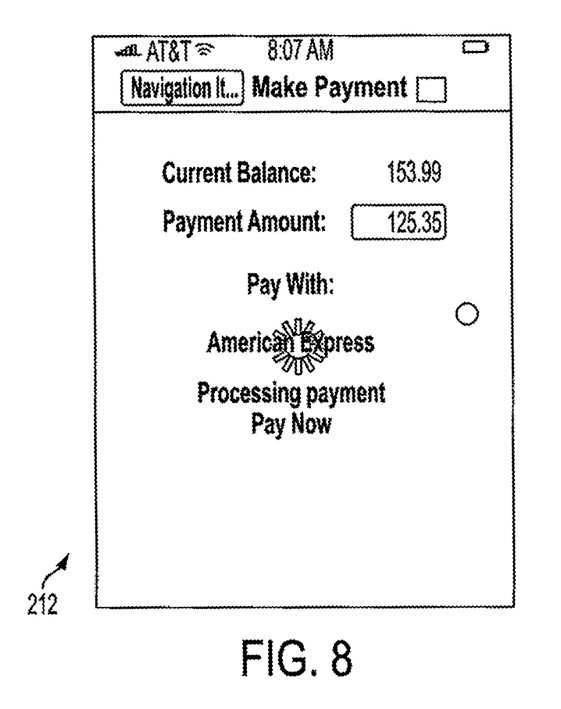
FIG. 8 is a schematic, pictorial representation of an illustrative embodiment of a payment processing display on the communication device.

Once the payor 208 has selected a payment method, the payor 208 may activate the pay button 258 to initiate processing of the payment. A payment processing display is shown in FIG. 8. In one example, the payment notification prompt 240 in FIG. 3 may include the pay button 258 so that the payment can be made to the payee 226 with the activation, or touch, of only a single button. In this example, the payment data 264 that is sent from the communication device 202 may include pre-defined preferences set by the payor 208 in his or her payor profile 242.

In one embodiment, activating the pay button 258 sends the payment data 264 to the payment manager 224, which relays the payment data 264 to the payee 226. In another embodiment, the payment data 264 may be sent directly from the communication device 202 to the payee 226 for processing; in this embodiment, the payment data 264 transmission may utilize a web service housed at the payee 226, or a proxy web service hosted elsewhere. The payment data 264 may also be sent to the payment manager 224, or an administrator of the payment manager 224, and delivered to the payee 226 in batch files or through web services. The payment data 264 may include any data relating to a payment to the payee 226, such as a credit card type, credit card number, security code, expiration date, routing number, payment amount, scheduled payment transfer time, etc.

Figure 9:
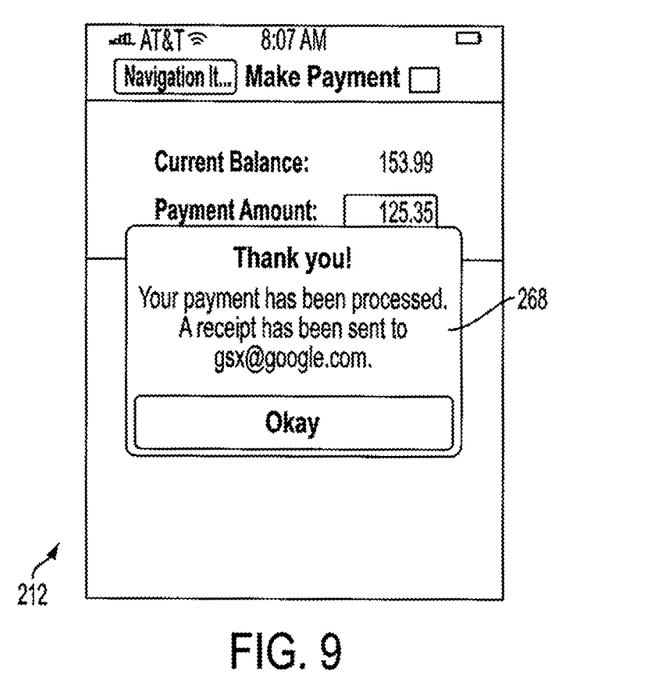
FIG. 9 is a schematic, pictorial representation of a payment confirmation prompt.

Upon successful processing of the payment data 264, the communication device 202 may then receive a payment confirmation 266, which indicates that the payment has been successfully processed. The payment confirmation 266 may be sent directly from the payee 226 to the communication device 202. In another embodiment, the payment manager 224 may receive the payment confirmation 266 from the payee 226 and relay the payment confirmation 266 to the communication device 202. Upon receipt of the payment confirmation 266, a payment confirmation prompt 268 may be displayed on the graphical user interface 212, as shown in FIG. 9. In another embodiment, once the payment data 264 is accepted by a proxy service, the payee 226 web service, or systems administered by the payment manager 224, an administrator of the payment manager 224 may process the payment and return the payment confirmation 266 to the communication device 202, which will trigger display of the payment confirmation prompt 268.

Figure 10:
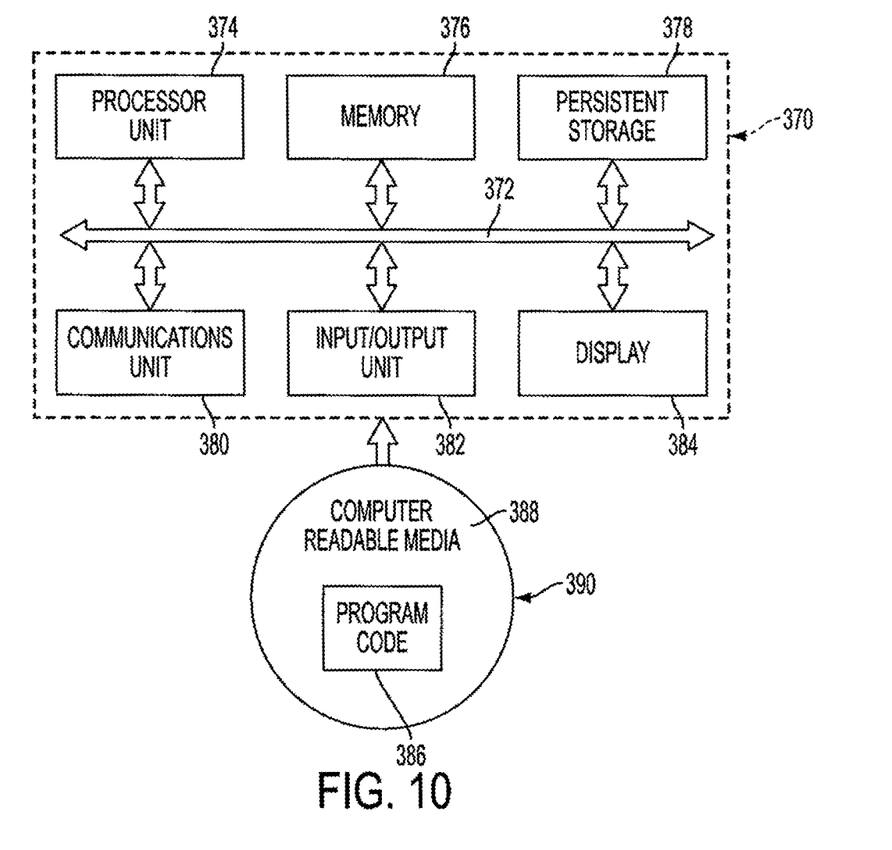
FIG. 10 is a schematic, block diagram of a data processing system in which the illustrative embodiments may be implemented.

With reference now to FIG. 10, a block diagram of a data processing system 370 is shown in which illustrative embodiments may be implemented. In one embodiment, the data processing system 370 is an example of a communication device, such as a cellular phone, in which a payment notification application, such as the payment notification application 238 in FIG. 2, may be implemented. In another embodiment, the data processing system 370 is an example of a computer in a network of computers, such as the network of computers 104 in FIG. 1, in which a payment manager, such as the payment manager 224 in FIG. 2, may be implemented. Computer-usable program code or instructions implementing the processes used in the illustrative embodiments may be located on the data processing system 370. The data processing system 370 includes a communications fabric 372, which provides communications between a processor unit 374, a memory 376, a persistent storage 378, a communications unit 380, an input/output (I/O) unit 382, and a display 384.

The processor unit 374 serves to execute instructions for software that may be loaded into the memory 376. The processor unit 374 may be a set of one or more processors or may be a multi-processor core, depending on the particular implementation. Further, the processor unit 374 may be implemented using one or more heterogeneous processor systems in which a main processor is present with secondary processors on a single chip. As another illustrative example, the processor unit 374 may be a symmetric multi-processor system containing multiple processors of the same type.

The memory 376, in these examples, may be, for example, a random access memory or any other suitable volatile or non-volatile storage device. The persistent storage 378 may take various forms depending on the particular implementation. For example, the persistent storage 378 may contain one or more components or devices. For example, the persistent storage 378 may be a hard drive, a flash memory, a rewritable optical disk, a rewritable magnetic tape, or some combination of the above. The media used by the persistent storage 378 also may be removable. For example, a removable hard drive may be used for the persistent storage 378.

The communications unit 380, in these examples, provides for communications with other data processing systems or communication devices. In these examples, the communications unit 380 may be a network interface card. The communications unit 380 may provide communications through the use of either or both physical and wireless communication links.

The input/output unit 382 allows for the input and output of data with other devices that may be connected to the data processing system 370. For example, the input/output unit 382 may provide a connection for user input through a keyboard and mouse. Further, the input/output unit 382 may send output to a printer. In the case in which the data processing system 370 is a cellular phone, the input/output unit 382 may also allow devices to be connected to the cellular phone, such as microphones, headsets, and controllers. The display 384 provides a mechanism to display information to a user. In the case in which the data processing system 370 is a cellular phone, the display 214 may be a graphical user interface on the cellular phone.

Instructions for the operating system and applications or programs are located on the persistent storage 378. These instructions may be loaded into the memory 376 for execution by the processor unit 374. The processes of the different embodiments may be performed by the processor unit 372 using computer-implemented instructions, which may be located in a memory, such as the memory 376. These instructions are referred to as program code, computer-usable program code, or computer-readable program code that may be read and executed by a processor in the processor unit 372. The program code in the different embodiments may be embodied on different physical or tangible computer-readable media, such as the memory 376 or the persistent storage 378.

Program code 386 is located in a functional form on a computer-readable media 388 and may be loaded onto or transferred to the data processing system 370 for execution by the processor unit 374. The program code 386 and the computer-readable media 388 form computer program product 390 in these examples. In one embodiment, the computer program product 390 is a payment notification application, such as the payment notification application 238 in FIG. 2. In this embodiment, the data processing system 370 may be a communication device, and the program code 386 may include computer-usable program code capable of receiving a payment notification, displaying a payment reminder prompt on a graphical user interface of the communication device, receiving payment input from the payor to form payment data, and sending the payment data when the computer usable program code is deployed in the communication device.

In one example, the computer-readable media 388 may be in a tangible form, such as, for example, an optical or magnetic disc that is inserted or placed into a drive or other device that is part of the persistent storage 378 for transfer onto a storage device, such as a hard drive that is part of the persistent storage 378. In a tangible form, the computer-readable media 388 also may take the form of a persistent storage, such as a hard drive or a flash memory that is connected to the data processing system 370. The tangible form of computer-readable media 388 is also referred to as computer recordable storage media.

Alternatively, the program code 386 may be transferred to the data processing system 370 from the computer-readable media 388 through a communication link to the communications unit 380 and/or through a connection to the input/output unit 382. The communication link and/or the connection may be physical or wireless in the illustrative examples. The computer-readable media also may take the form of non-tangible media, such as communication links or wireless transmissions containing the program code 386. In the example in which the data processing system 370 is a communication device, the program code 386 may be deployed to the communication device via CDMA, including cdmaOne or CDMA2000, GSM, 3G, Edge, an Over-the-air network, Bluetooth, or any other wireless transmission medium.

The different components illustrated for the data processing system 370 are not meant to provide architectural limitations to the manner in which different embodiments may be implemented. The different illustrative embodiments may be implemented in a data processing system including components in addition to or in place of those illustrated for data processing system 370. Other components shown in FIG. 10 can be varied from the illustrative examples shown.

As one example, a storage device in the data processing system 370 is any hardware apparatus that may store data. The memory 376, the persistent storage 378, and the computer-readable media 388 are examples of storage devices in a tangible form.

In another example, a bus system may be used to implement the communications fabric 372 and may be comprised of one or more buses, such as a system bus or an input/output bus. Of course, the bus system may be implemented using any suitable type of architecture that provides for a transfer of data between different components or devices attached to the bus system. Additionally, the communications unit 380 may include one or more devices used to transmit and receive data, such as a modem or a network adapter. Further, a memory may be, for example, the memory 376 or a cache such as found in an interface and memory controller hub that may be present in the communications fabric 372.

Figure 11:
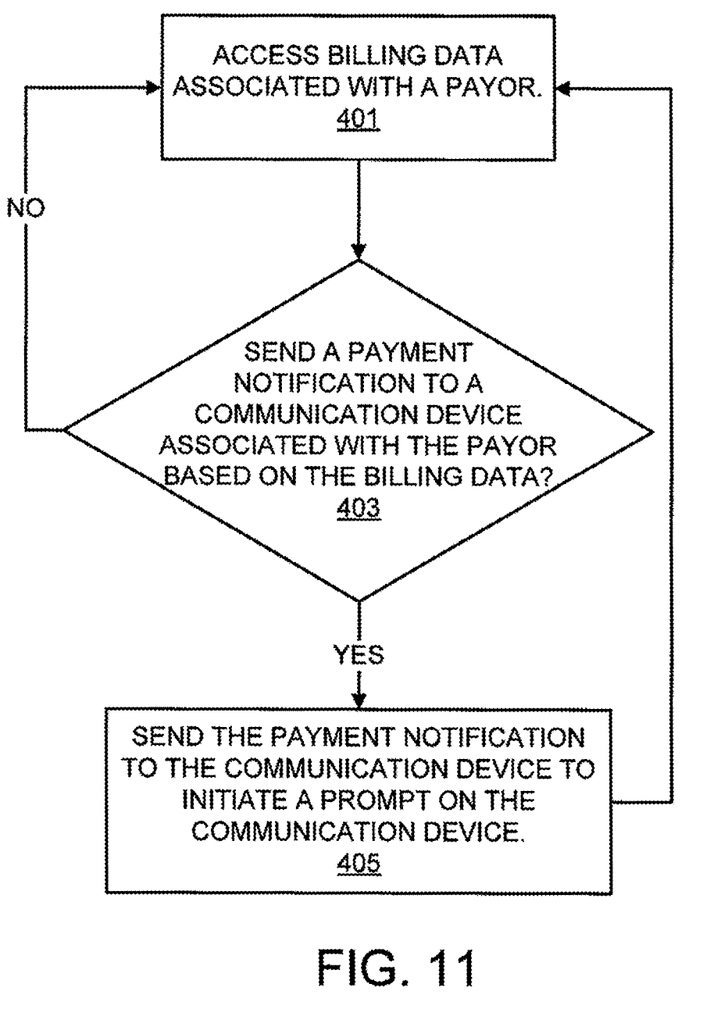
FIG. 11 is a schematic flowchart illustrating a process for managing payments to a payee using a communication device according to an illustrative embodiment.

Referring now to FIG. 11, an illustrative embodiment of a process that may be executed by the payment manager 224 in FIG. 2 includes accessing billing data associated with a payor (step 401). The process determines whether to send a payment notification to a communication device associated with the payor based on the billing data (step 403). If the process determines not to send a payment notification to the communication device, the process returns to step 401. If the process determines to send the payment notification to the communication device, the process proceeds to step 405, in which the process sends the payment notification to the communication device to initiate a prompt on the communication device.

Figure 12:
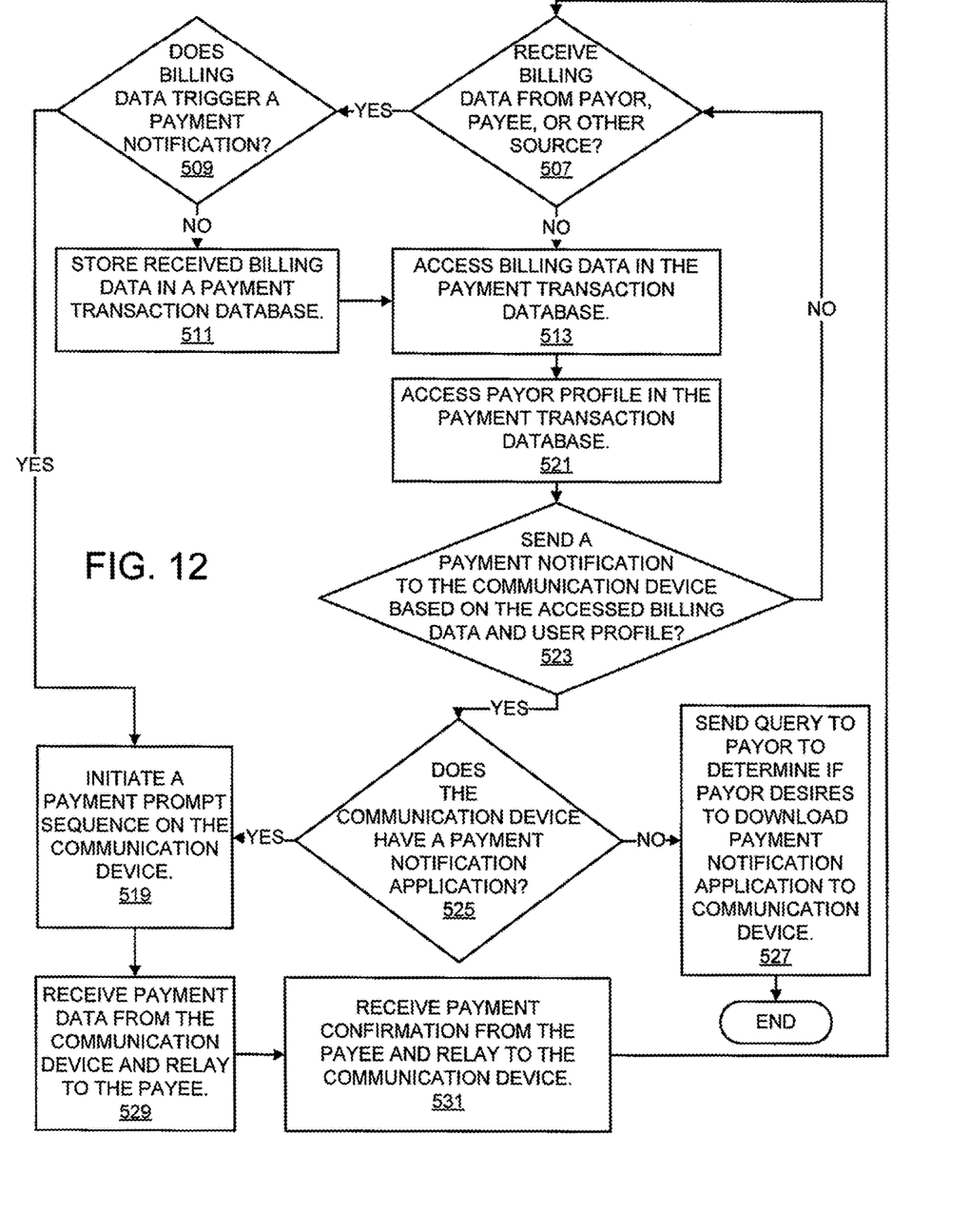
FIG. 12 is a schematic flowchart illustrating a process for managing payments to a payee using a communication device according to another illustrative embodiment.

Referring to FIG. 12, an illustrative embodiment of a process that is executable by a payment manager, such as the payment manager 224 in FIG. 2, includes determining whether billing data is received from a payor, payee, or other source (step 507). If the process determines that the billing data is received from the payor, payee, or other source, then the process determines whether the billing data triggers a payment notification (step 509). If the process determines that the billing data does not trigger a payment notification, the process stores the received billing data in a payment transaction database (step 511). The process then proceeds to step 513, in which billing data is accessed in the payment transaction database (step 513). Returning to step 509, if the process determines that the billing data does trigger a payment notification, the process proceeds to step 519, which will be described later. Returning to step 507, if the process determines that billing data is not received from the payor, payee, or other source, then the process proceeds to step 513.

The process accesses a payor profile in the payment transaction database (step 521). The process then determines whether to send a payment notification to the communication device based on the accessed billing data and user profile (step 523). If the process determines not to send a payment notification, then the process returns to step 507. If the process determines to send a payment notification, then the process determines whether the communication device has a payment notification application (step 525). If the process determines that the communication device does not have a payment notification application, the process sends a query to the payor to determine if the payor desires to download a payment notification application to his or her communication device (step 527). The process then terminates.

Returning to step 525, if the process determines that the communication device does have a payment notification application, the process initiates a payment prompt sequence on the communication device (step 519). The process then receives payment data from the communication device and relays the payment data to the payee (step 529). The process then receives a payment confirmation from the payee and relays the payment confirmation to the communication device (step 531). The process then returns to step 507.

Figure 13:
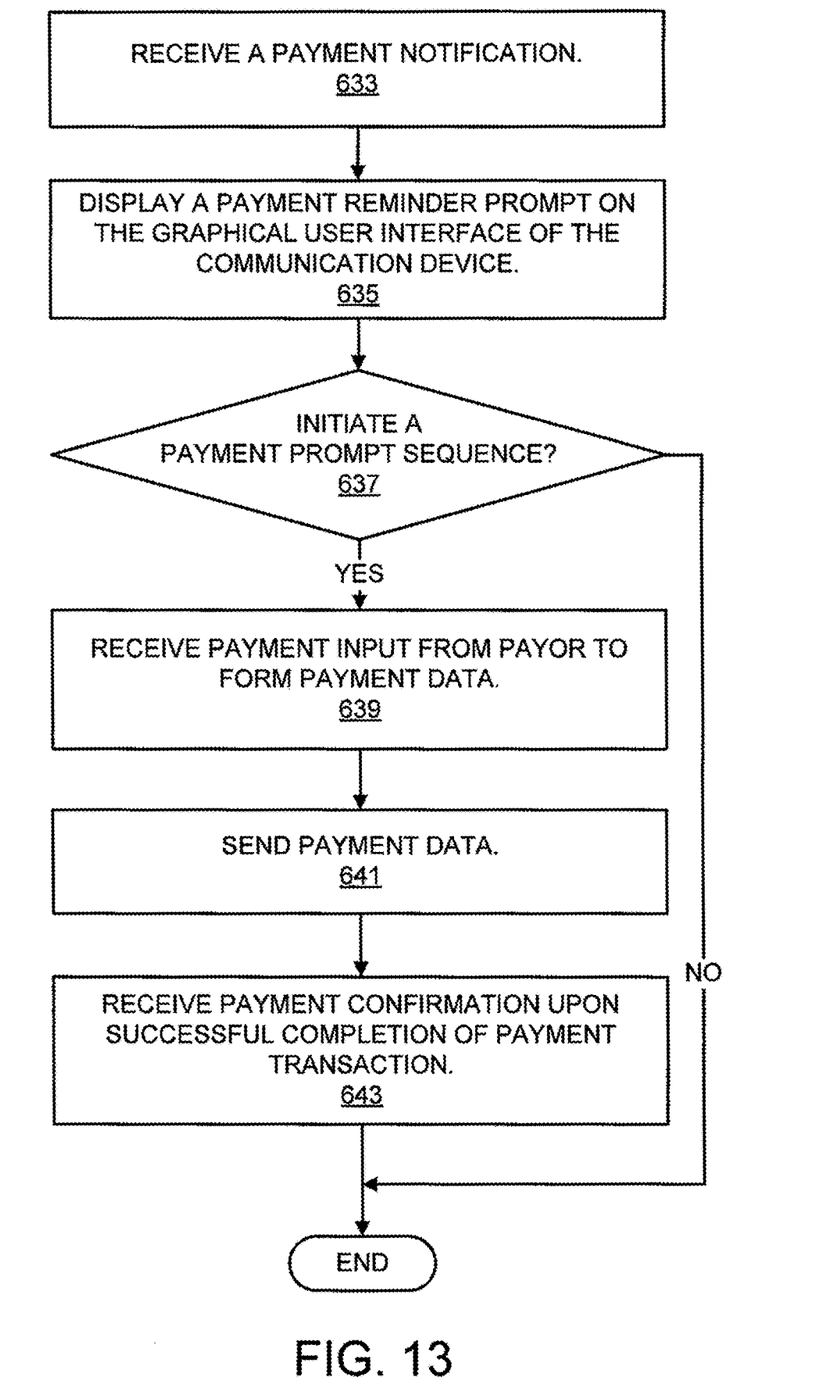
FIG. 13 is a schematic flowchart of a process for managing payments to a payee that is executable by a payment notification application on a communication device according to an illustrative embodiment.

Referring to FIG. 13, an illustrative embodiment of a process that may be implemented by a payment notification application, such as the payment notification application 238 in FIG. 2, includes receiving a payment notification (step 633). The process displays a payment reminder prompt on the graphical user interface of the communication device (step 635).

The process determines whether to initiate a payment prompt sequence (step 637). If the process determines not to initiate a payment prompt sequence, the process then terminates. If the process determines to initiate a payment prompt sequence, the process receives payment input from the payor to form payment data (step 639). The process then sends the payment data (step 641). The process then receives a payment confirmation upon successful completion of the payment transaction (step 643). The process then terminates.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the Figures. For example, in some cases, two blocks shown in succession may be executed substantially concurrently, or the blocks may sometimes be executed in the reverse order, depending upon the functionality involved.

The principles of the present invention can take the form of an entirely hardware embodiment, an entirely software embodiment, or an embodiment containing both hardware and software elements. In one embodiment, the invention is implemented in software, which includes but is not limited to, firmware, resident software, microcode, and other computer readable code.

Furthermore, the principles of the present invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed is:

1. A method comprising:
    determining, by a remote computer, to send a payment notification to a communication device of a user based on billing data of the user, wherein the determining comprises determining that the communication device has a notification application based on a device identifier of the communication device stored in an application database of the notification application;
    transmitting, by the remote computer, a push notification to the notification application on the communication device, wherein the push notification comprises a port-directed short message service (SMS) notification which causes the notification application to wake up on the communication device and automatically initiate a display of a prompt sequence on a graphical user interface (GUI) of the communication device which starts with a view option for viewing the payment notification;
    detecting, by the remote computer, a selection of the view option via the initiated prompt sequence on the communication device;
    in response to detecting the selection of the view option, transmitting, by the remote computer, an additional prompt in the prompt sequence to the communication device which displays billing data details within the GUI and includes a submit payment option;
    detecting, by the remote computer, a selection of the submit payment option; and
    in response to detecting the selection of submit payment option, transmitting, by the remote computer, another additional prompt in the prompt sequence to the communication device, which activates a button for making a payment within the GUI.

2. The method of claim 1, further comprising:
    receiving the billing data from at least one of the user and the communication device of the user; and
    storing the billing data on a payment transaction database, wherein the method further comprises accessing the billing data from the payment transaction database.

3. The method of claim 1, further comprising:
    receiving payment data from the communication device; and
    sending the payment data to a payee.

4. The method of claim 1, further comprising:
    receiving a payment confirmation from a payee; and
    sending the payment confirmation to the communication device.

5. The method of claim 1, further comprising:
    accessing a payor profile containing data associated with the user; and
    sending a suggested payment method to the communication device based on the payor profile.

6. The method of claim 5, wherein the payor profile comprises a set of user-definable settings.

7. A data processing device, comprising:
    a bus system;
    a memory connected to the bus system, wherein the memory includes a set of instructions; and
    a processing unit connected to the bus system, wherein the set of instructions are configured to cause the processing unit to:
        determine to send a payment notification to a communication device of a user based on billing data of the user, wherein the determining comprises determining that the communication device has a notification application based on a device identifier of the communication device stored in an application database of the notification application,
        transmitting a push notification to the notification application on the communication device, wherein the push notification comprises a port-directed short message service (SMS) notification which causes the notification application to wake up on the communication device and automatically initiate a display of a prompt sequence on a graphical user interface (GUI) of the communication device which starts with a view option for viewing the payment notification,
        detect a selection of the view option via the initiated prompt sequence on the communication device,
        in response to detecting the selection of the view option, transmit an additional prompt in the prompt sequence to the communication device which displays billing data details within the GUI and includes a submit payment option;

detect a selection of the submit payment option; and in response to detecting the selection of submit payment option, transmit another additional prompt in the prompt sequence to the communication device, which activates a button for making a payment within the GUI.

8. The data processing device of claim 7, wherein the set of instructions are further configured to cause the processor to:

access a payor profile containing data associated with the user, wherein the determination of whether to send the payment notification to the communication device is based on the payor profile and the billing data.

9. A method comprising:

determining to send a payment notification to a communication device of a user based on billing data of the user, wherein the determining comprises determining that the communication device has a notification application based on a device identifier of the communication device stored in an application database of the notification application;

determining, by the remote server, that a payment notification application has not been installed by a communication device associated with a user;

deploying the payment notification application, by the remote server, to the communication device associated with the user;

sending a push notification to the deployed payment notification application installed on the communication device, wherein the push notification comprises a port-directed short message service (SMS) notification which causes the notification application to wake up on the communication device and automatically initiate a display of a prompt sequence on a graphical user interface (GUI) of the communication device which starts with a view option for viewing the payment notification;

detecting, by the remote computer, a selection of the view option via the initiated prompt sequence on the communication device;

in response to detecting the selection of the view option, transmitting, by the remote computer, an additional prompt in the prompt sequence to the communication device which displays billing data details within the GUI and includes a submit payment option;

detecting, by the remote computer, a selection of the submit payment option; and in response to detecting the selection of submit payment option, transmitting, by the remote computer, another additional prompt in the prompt sequence to the communication device, which activates a button for making a payment within the GUI.

10. The method of claim 9, wherein the communication device comprises a cellular phone.

11. The method of claim 9, wherein the method further comprises displaying a payment method prompt querying the user for a desired payment method and receiving user input from indicating the desired payment method.

12. The method of claim 11, wherein the desired payment method is different from a suggested payment method.

13. The method of claim 1, wherein the determining to send the payment notification is triggered in response to the billing data being received from an external source.

14. The method of claim 1, wherein the determining to send the payment notification is triggered based on preferences of the user stored in a profile which specifies when the user is to be notified of the payment information.

* * * * *